United States Patent [19]
Beshai et al.

[11] Patent Number: 5,881,049
[45] Date of Patent: Mar. 9, 1999

[54] ADMISSION CONTROL IN AN ATM SWITCHING NODE

[75] Inventors: Maged E. Beshai, Stittsville; Todd D. Morris, Kanata, both of Canada

[73] Assignee: Northern Telecom Limited, Montreal, Canada

[21] Appl. No.: 723,649

[22] Filed: Oct. 3, 1996

[51] Int. Cl.$^6$ .................................................. H04J 3/14
[52] U.S. Cl. .................. 370/230; 370/230; 370/234; 370/235; 370/395
[58] Field of Search ................................. 370/230, 232, 370/233, 235, 234, 395

[56] References Cited

U.S. PATENT DOCUMENTS

| | | | |
|---|---|---|---|
| 5,315,586 | 5/1994 | Charvillat | 370/232 |
| 5,530,695 | 6/1996 | Dighe et al. | 370/232 |
| 5,548,581 | 8/1996 | Makrucki | 370/232 |
| 5,583,857 | 12/1996 | Soumiya et al. | 370/234 |

OTHER PUBLICATIONS

"Effective Bandwidth for the Multi–Type UAS Channel", R.J. Gibbens et al., Queueing Systems No. 9, J.C. Baltzer A.G. Scientific Publishing Company, 1991, pp. 17–28.

"Squeezing the Most Out of ATM", G.L. Choudhury et al., IEEE Transactions on Communications, vol. 44, No. 2, Feb. 1996, pp. 203–217.

"Exponential Upper Bounds via Martingales for Multiplexers with Markovian Arrivals", E. Buffet et al., Journal of Applied Probability, 1993, pp. 1–14.

"Equivalent Capacity and Its Application to Bandwidth Allocation in High–Speed Networks", R. Guerin et al., IEEE Journal on Selected Areas in Communications, vol. 9, No. 7, Sep. 1991, p. 968981.

"Designing an ATM–Based Broadband Network: An Overview", J. Yan et al., Globecom, Singapore, Nov. 1995 and the 9th ITC Specialists Seminar, Leidschendam, the Netherlands, Nov. 1995, pp. 1–7.

"Traffic Considerations in the Synthesis of an ATM–Based Network", J. Yan et al., Globecom, Singapore, Nov. 1995 and the 9th ITC Specialists Seminar, Leidschendam, the Netherlands, Nov. 1995, pp. 1–18.

*Primary Examiner*—Chi H. Pham
*Assistant Examiner*—Frank Duong

[57] ABSTRACT

The invention resides in a precise technique for determining the equivalent bit rate (EBR) of a variable bit rate (VBR) ATM connection. The technique extends a known single-source method developed by Gibbens and Hunt. The new technique applies to shared facilities and hence exploits the statistical-multiplexing gain. The calculation of the EBR is quite fast and is therefore suitable for real-time call-admission control in ATM switches. The admission criteria may be based on either the cell loss or cell delay.

20 Claims, 9 Drawing Sheets

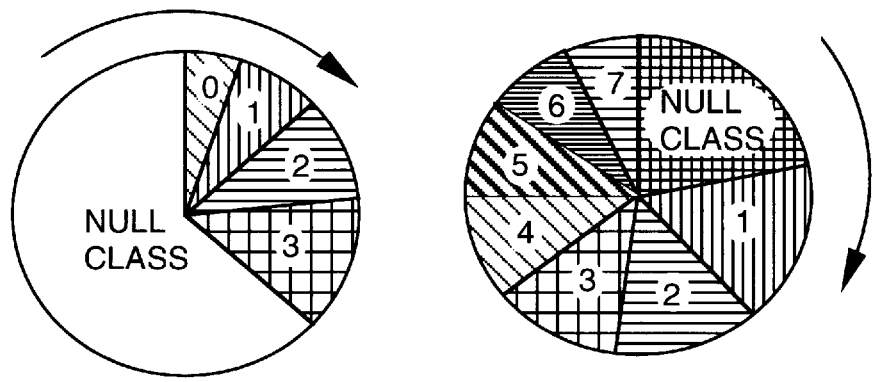
(a) Primary controller:
Constant service rate
per class
Fig 8
(b) Secondary controller:
Variable service rate
per class
Fig 9
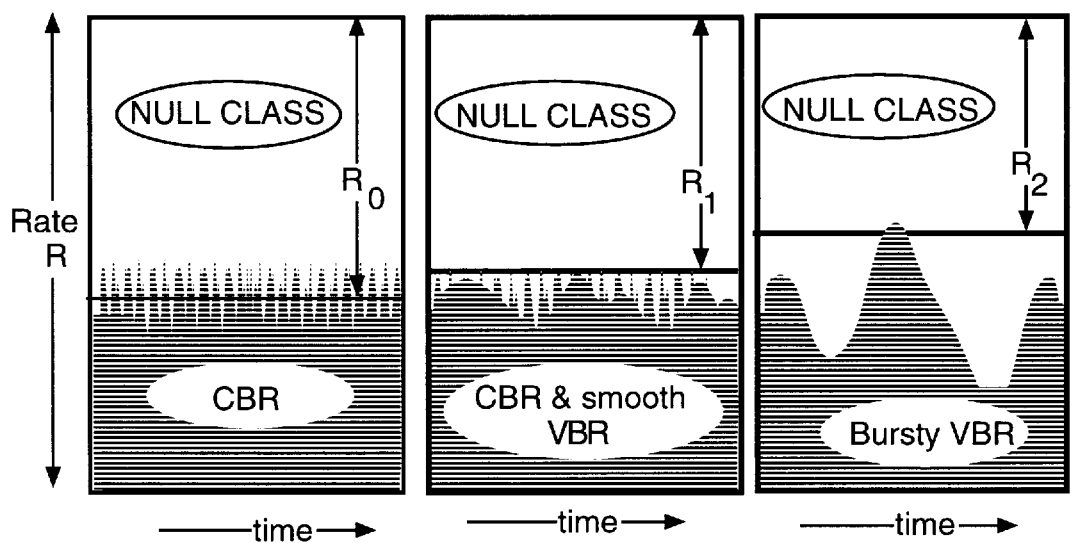
Fig 10    Fig 11    Fig 12

—— BD
········ Invention

ADMISSION CONTROL IN AN ATM SWITCHING NODE

FIELD OF INVENTION

The present invention resides in the field of management of ATM-based telecommunications networks. In particular, it is directed to ATM network management by a novel technique of estimating the equivalent bit rate of connections or the quality-of-service parameter and a connection admission control which is based on such a technique.

BACKGROUND OF INVENTION

Connection admission control (CAC) is an important element of ATM traffic management. CAC provides access control by regulating the number and types of connections that can be allowed at any given time for a given amount of resources. In an ATM multi-service network, the resource demand of each connection has to be estimated as a function of the cell-level traffic descriptors, the required quality-of-service (QOS), the states of the network resources, the traffic-stream class or priority, and arguably the nodal architecture. The routing decisions, in turn, depend on the estimated resource demand.

Much of the extensive work on ATM communications focused on the analysis of the aperiodic multiplexer (often called the statistical multiplexer). The main objective of the analysis is to determine performance indices, such as the cell-loss probability and cell-delay, given the storage capacity of the multiplexing facility and the traffic descriptors of the mixture of traffic streams. The equivalent-bit-rate (EBR) of a connection is a natural by-product of the performance analysis. The problem here is to find a nominal bit-rate, the EBR, for each connection so that the system meets the specified performance objectives as long as the sum of the EBR values of the accepted connections does not exceed the capacity of the designated link.

There are various works on calculating bandwidth requirements and the following are some examples.

[1] R. J. Gibbens and P. J. Hunt, "Effective Bandwidths for the Multi-Type UAS Channel", Queueing Systems No. 9, (1991) pp. 17–28;

[2] G. L. Choudhury, D. M. Lucantoni and Ward Witt, "Squeezing the Most Out of ATM", IEEE Transactions on Communications, Vol. 44, No. 2, February 1996, pp. 203–217;

[3] E. Buffet and N. G. Duffield, "Exponential Upper Bounds Via Martingales for Multiplexers with Markovian Arrivals", Journal of Applied Probability (1993);

[4] A variation of [1] above, "Equivalent Capacity and Its Application to Bandwidth Allocation in High-Speed Networks" by Guerin et al., IEEE Journal on Selected Areas in Communications, Vol. 9, No. 7, September 1991;

[5] The gist of the invention is contained in papers presented by J. Yan and the inventor at Globecom, Singapore, November, 1995, and at the 9th ITC Specialists Seminar, Leidschendam, the Netherlands, November 1995. The papers are entitled "Designing an ATM-Based Broadband Network: An Overview" and "Traffic Considerations in the Synthesis of an ATM-Based Network".

ATM admission control can be based on either of two approaches: a direct performance-evaluation approach or an inverse resource-requirement-estimation approach. In the direct approach, the estimated cell-level performance resulting from the admission of a new connection (or call) is calculated. In the inverse approach, an EBR ("equivalent bit rate", often called the "equivalent bandwidth" or "effective bandwidth") of the new arrival is determined by some artifice or another. The connection is accepted if the remaining unassigned capacity of the route is not less than the calculated EBR. The EBR for a connection which traverses several links may vary from link to link and would be based on the source's traffic descriptors, the cell-level performance objectives, the speed of the link under consideration, and the buffer size. The burst length is usually assumed to be exponentially distributed. The assigned fraction of the capacity of a link, i.e., the sum of the EBR values of all connections traversing the link, divided by the total link capacity, is hereinafter called the call-level occupancy. The actual link utilization is called the cell-level occupancy. The call-level occupancy is generally higher than the cell-level occupancy. It should be noted that the direct and inverse approaches are two aspects of the same technique, in other words, the QOS and EBR are two parameters of the same equation.

The traffic may comprise protected and unprotected streams. The protected streams, such as the CBR (constant-bit-rate) and the VBR (variable-bit-rate) traffic, are promised a specified quality-of-service (QOS). The unprotected streams, such as the UBR (unspecified-bit-rate) traffic, must rely on the unused time slots of the protected streams.

The EBR calculation can be based on several rate-control disciplines such as the per-connection control proposed by Gibbens and Hunt, a class-based control, a link-based control, or any combination of these. These controls and the resulting bandwidth utilization are graphically shown in the following figures.

The per-connection calculation is shown in FIG. 1. There is a mixture of different types of connections, e.g., VBR (variable bit rate) and CBR (constant bit rate). Each connection, a–j, is guaranteed a service rate and the combined service rate for all the connections is the link capacity R. The total mean rate of all the connections is indicated by M, M<R. The EBR for each connection is calculated according to a single-source model, e.g., the Gibbens-Hunt (GH) method referenced [1] above. The Gibbens-Hunt model assumes buffer sharing, but the link capacity is assumed to be divided into partitions each of which is dedicated to a single connection. If link sharing was permitted, the sum $E_1$ of the EBR values would be less than R. The traffic intensity is also indicated in the figure in relation to time. As there is no sharing of the link capacity among the connections, this control discipline results in a large unused (unassigned) capacity. In practice, the link is actually shared.

Similarly the per-class calculation is shown in FIG. 2. Connections a–j are grouped into classes 0–2. Each class is guaranteed a prescribed service rate. Within a class, the capacity is shared by its connections, e.g., a–d of class 0, resulting in more efficient resource management. The invention modifies the Gibbens-Hunt calculation of the EBR of each connection within a class by taking the capacity sharing into account. This modified method is the technique of the invention. The sum of all the combined EBR values of all the classes is shown as $E_2$. (Note that $E_2 \geq E_1$.) This control realizes a reduction in the unassigned capacity over the per-connection control as the result of sharing gain because the remaining part of the link capacity can be declared as "guaranteed available rate" for new connections. The unassigned capacity is treated in the same way as in the case of per-connection control. There is, however, no sharing among the classes.

In FIG. 3, the per-link control is illustrated. The link capacity R is shared by all its connections, each of which is guaranteed a prescribed service quality. The combined EBR values of all the connections is calculated according to the modified Gibbens-Hunt method of the invention based on the link rate instead of the class allocated rate and is shown as $E_3$ ($E_3=E_1$). The remaining part of the link capacity can now be declared as "guaranteed available rate" and can be offered to new connections of protected traffic.

The part marked scrap in FIGS. 1–3 cannot be used reliably by new connections of protected traffic. In any case, the unused cell time can always be made available to the unprotected traffic streams (such as UBR).

The present invention therefore resides in the bandwidth estimation techniques based on the work described by Gibbens-Hunt in their above-referenced article [1]. It also resides in the field of connection admission control for ATM networks using such an estimated bandwidth.

OBJECTS OF THE INVENTION

It is therefore an object of the invention to provide a method of admission control in an ATM network.

It is a further object of the invention to provide a method of determining the EBR for VBR traffic in an ATM network.

It is another object of the invention to provide a method in which the problem of QOS guarantees can be solved by decomposition.

It is another object of the invention to provide a method in which the probability of buffering incoming traffic is used to modify the permissible cell loss for traffic which has to join the buffer.

It is yet another object of the invention to provide a method for admission control of an ATM node handling a multitude of heterogeneous traffic streams.

It is yet a further object of the invention to provide a method of admission control which lends itself to real-time implementation by minimizing the required computational effort.

SUMMARY OF THE INVENTION

Briefly stated, according to one aspect, the present invention relates to a method of managing an ATM network by performing call admission control on a connection request at a node which includes a buffer. The method comprises steps of calculating the probability $\beta$ of incoming cells of the requested connection joining the buffer, if the requested connection is to be accepted, and calculating the probability $\eta$ of the buffer occupancy exceeding a given threshold, if the requested connection is to be accepted. The buffer occupancy is defined as the number of cells waiting in the buffer. The method further includes a step of determining that the requested connection can be admitted, if $\log_e\beta+\log_e\eta<S<0$, where S is the natural logarithm of a predetermined quality-of-service objective.

According to another aspect, the invention is directed to a method of controlling traffic in an ATM network by performing a call admission control on a requested connection at a node which includes a buffer. The method comprises steps of calculating the probability $\beta$ of incoming cells of the requested connection joining the buffer, if the requested connection is to be accepted, and calculating the probability $\eta$ of the buffer overflowing if the requested connection is to be accepted. The method further includes steps of calculating the equivalent bit rate (EBR) $\omega$ of the requested connection from $\beta$ and $\eta$ above and determining that the requested connection can be admitted, if $\omega<W$, where W is the available capacity of the designated link.

According to yet another aspect, the present invention is directed to a method of admission control where the shared link is divided into a number of virtual sub-links each of which serves a stream of homogeneous traffic. One such stream is the well-behaved voice traffic which has well known characteristics.

According to a further aspect, the present invention is directed to a method of admission control of heterogeneous traffic sharing the same link. The method treats each request independently from each other, with each request assuming that the entire traffic on the shared capacity is statistically identical with identical descriptors. The deviations resulting from such an assumption tend to offset each other with a net effect on the conservative side.

BRIEF DESCRIPTION OF THE DRAWINGS

FIGS. 8 and 9 are pie-charts which depict the function of a controller for constant service-rate per class and for variable service-rate per class, respectively;

FIGS. 10, 11 and 12 are charts showing the capacity remaining from primary classes, and the heavy-dependence of the remaining capacity on intensity variance of primary class traffic;

DETAILED DESCRIPTION OF THE PREFERRED EMBODIMENTS OF INVENTION

Figure 4:
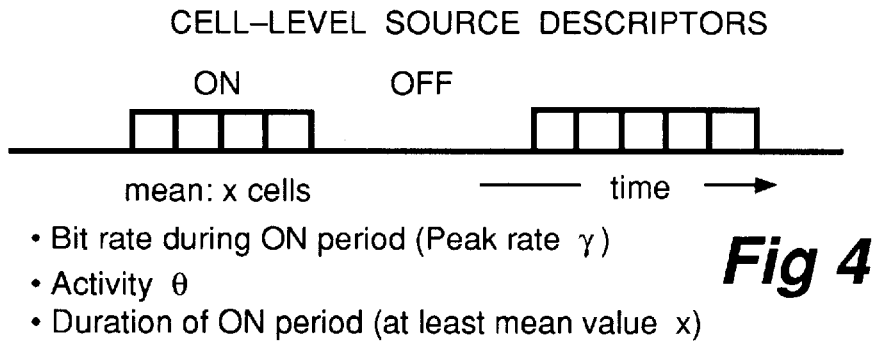
FIG. 4 is an illustration of the ON-OFF traffic model.

In calculating bandwidth requirements, two models are possible, one being a multiplexer with buffer or another a multiplexer without buffer. As shown in FIG. 4, the traffic is based on the ON-OFF model which uses the cell-level traffic descriptors as follows:

peak rate $\gamma$: the bit rate during the ON period source activity $\theta$: the proportion of time the source is active mean value x: mean number of cells in the ON period.

The table below shows the relevant parameters involved in such calculation.

|                       | Bufferless Multiplexer | Multiplexer with Buffer |
|-----------------------|------------------------|-------------------------|
| Traffic Parameters    | Peak Rate              | Peak Rate               |
|                       | Source Activity        | Source Activity         |
|                       |                        | Burst Length            |
| Multiplexer           | Link Rate              | Link Rate               |
| Parameters            |                        | Buffer Size             |
|                       |                        | Service Discipline      |

Let us start by describing the Gibbens-Hunt model. Using the parameters shown above, Gibbens and Hunt describe in their above-referenced article [1] a buffered model in which multiple types of calls are offered to a single channel. The link capacity is partitioned among the connections. There is no link-capacity sharing among the connections. In the article, the EBR ω for each connection of each type is determined from a formula which is rewritten here as:

$$\omega = \gamma(1+\epsilon+y-\sqrt{(1+\epsilon-y)^2+4y})/(2\epsilon)$$

where $\epsilon = x \ln(\zeta)/L$, and $y = \theta/(1-\theta)$, L being the buffer size and $\zeta$ is the cell loss probability.

The rewritten formula illustrates that the EBR is linearly dependent on the peak rate of the connection. This fact is not obvious in the original Gibbens-Hunt formula given in [1]. The effective call-level bandwidth utilization of a link is the sum of the EBR values of all calls of all types which traverse the link, divided by the link capacity.

The exact solution to this problem, which fully accounts for capacity sharing, is feasible as shown by Choudhury et al in [2] above. However, the complexity of the solution makes its real-time implementation unthinkable. Some approximations were also proposed in [2], however, as reported in [2], the approximations were unreliable.

As mentioned earlier, there are two approaches for connection admission control and there are two multiplexer models, as shown in the table below.

|                       | Bufferless Multiplexer                          | Multiplexer with Buffer                     |
|-----------------------|--------------------------------------------------|----------------------------------------------|
| Direct Approach       | Calculate blocking using an appropriate loss model | Calculate cell-loss or delay using an appropriate model |
| Inverse. EBR Approach | Calculate permissible load, for a specified QOS by inverting the above | |

The notations used herein are listed below:

R: link rate (bits/sec)
γ: peak rate of source (bits/sec)
θ: mean source activity (dimensionless), $0<\theta<1$
x: mean value of number of cells in ON period (burst size) in the ON-OFF source model
S: $e^S$ is QOS (for example $S=-7\times2.303$ corresponds to a cell loss probability of $10^{-7}$)
β: probability of arriving cells joining buffer
η: probability of buffer overflow, or exceeding a given occupancy threshold, given that the buffer is not empty
ω: EBR (bits/sec)
r: mean rate of source, $r=\theta\gamma$
ρ: mean cell occupancy of link (dimensionless), $0<\rho<1$.
L: buffer size (cells)
m: number of sources

A. Bufferless-Approximation

The number n of active sources that can be accommodated simultaneously in the link is $n=R/\gamma$. If $n \gg 1$ (of the order of 100 or so), the effect of the buffer on the cell-loss probability is relatively small and the multiplexer-system may be treated as a loss system with an offered load of mθ, in which case the burst duration is irrelevant. The analysis is then greatly simplified. For a sufficiently large ratio of the number of sources, m, to the number of equivalent servers, n, the probability, b, of link overflow may be approximated by the Erlang function $E(m\theta, R/\gamma)$. With a finite ratio m/n, with m>n, the probability of link overflow is approximated by:

$$b = \{1-(n/m)\}E(m\theta, R/\gamma) \qquad (1)$$

Figure 5:
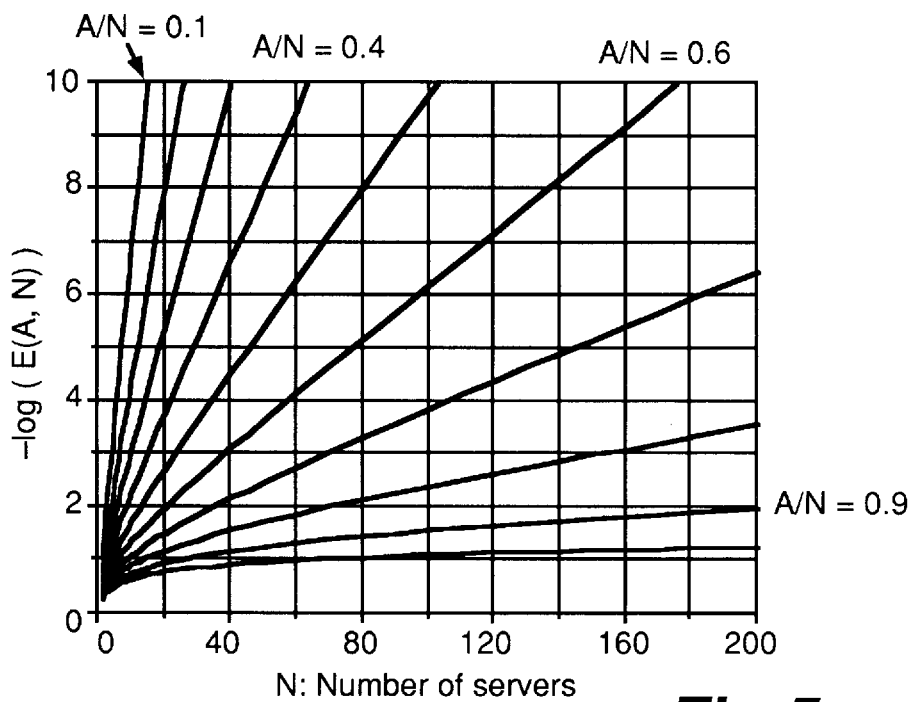
FIG. 5 is a graph showing a quasi-linear relationship between the blocking logarithm and the number of servers for a given load per server.

For a loss system of N servers with an offered load of "A" Erlangs, and under the assumption of Poissonian traffic, it is observed that the logarithm of the blocking, determined by the Erlang function E(A, N), exhibits an almost-linear relationship with N for a given A/N ratio in the low-blocking zone of interest, as depicted in FIG. 5. Fast calculation of the Erlang function for an arbitrary load "A" (or, inversely, the calculation of the load "A" corresponding to a specified blocking) can be realized by interpolation.

B. Multiplexer with Buffer

ATM multiplexers and switches must use buffers to hold the cells of the uncoordinated traffic sources. The acceptance, or otherwise, of a new connection is based on the expected buffer occupancy, amongst other factors. As described above, the calculations associated with the admission process can be greatly simplified if the existence of the buffer is ignored and the switches are treated as memoryless systems. This simplicity persuaded a number of researchers to adopt the bufferless approach as a basis for admission control. However, in this approach, the error can be of the order of 1,000%. Therefore, for actual implementation, the buffer effect must be taken into account. The two extremes of a bufferless system with link sharing and a shared-buffer system without link sharing cannot be used in a real system.

The following discussion applies to the model in which a multiplexer is provided with buffer. Given a number, m, of sources with identical traffic descriptors, it is required to determine the QOS. The CBR case is not discussed here. For VBR traffic, the steps are as follows:

(a) Direct Calculation

Figure 1:
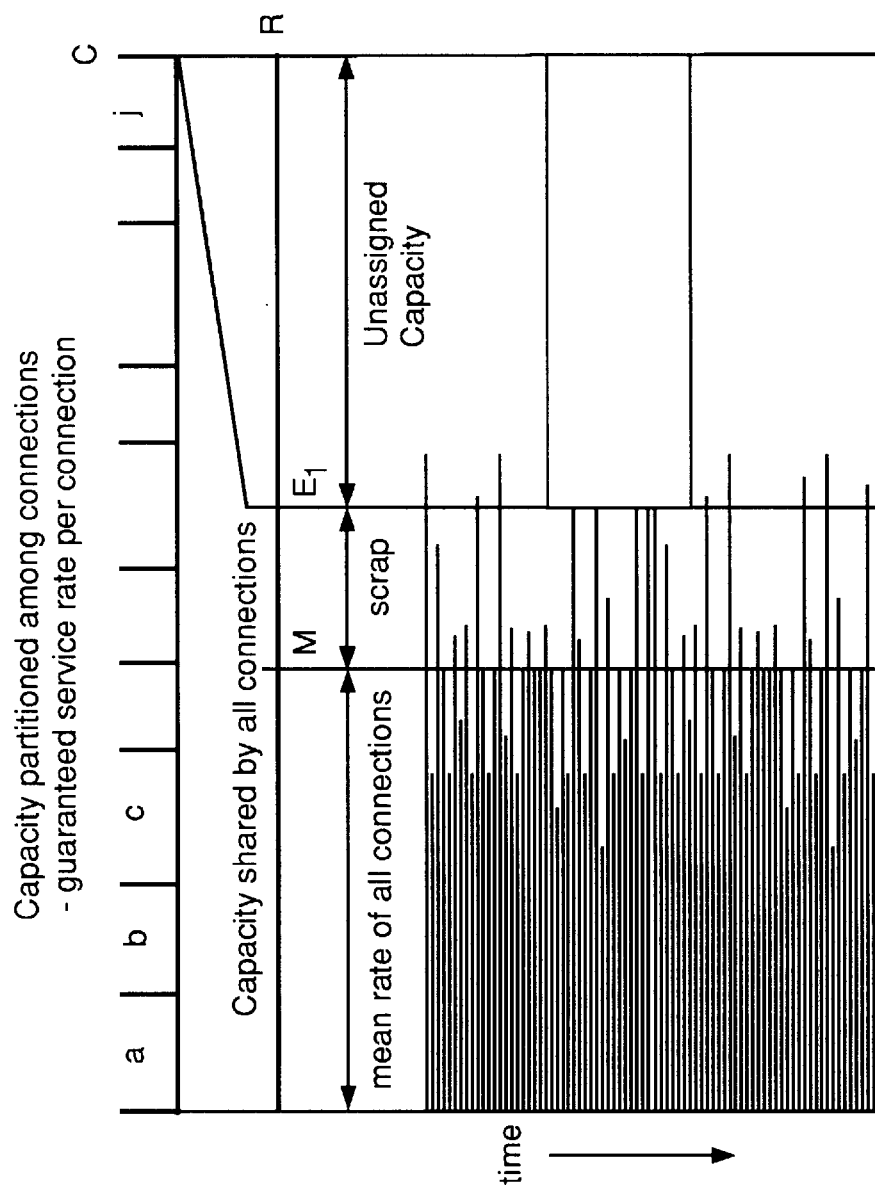
FIG. 1 is a graphical illustration of EBR allocations and bandwidth utilization on a per-connection basis.
Figure 2:
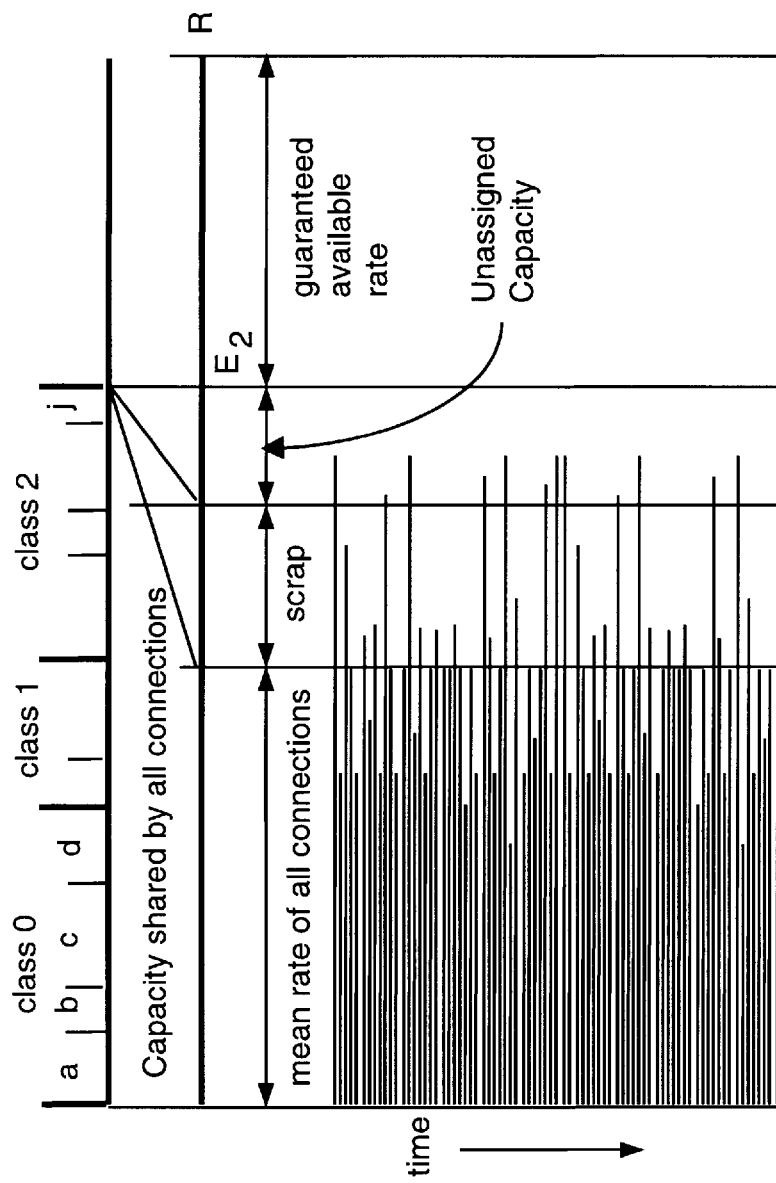
FIG. 2 is a graphical illustration of EBR allocations and bandwidth utilization on a per-class basis.
Figure 3:
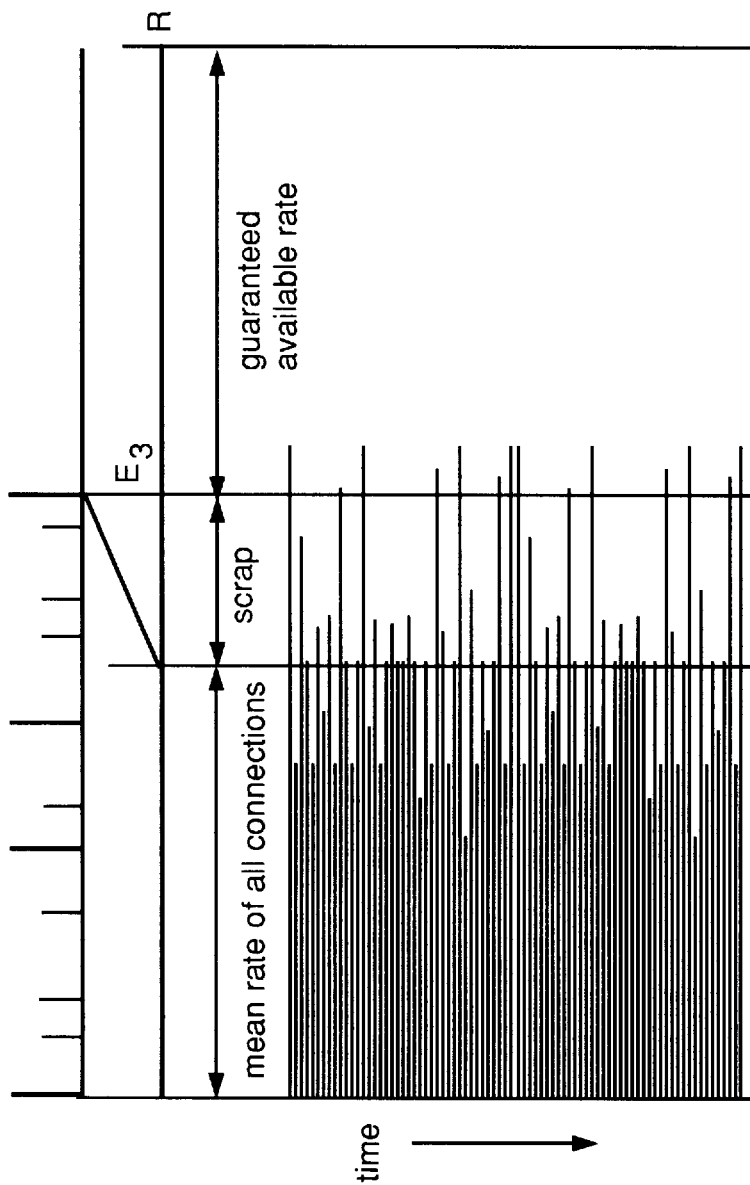
FIG. 3 is a graphical illustration of EBR allocations and bandwidth utilization on a per-link basis.
Figure 6:
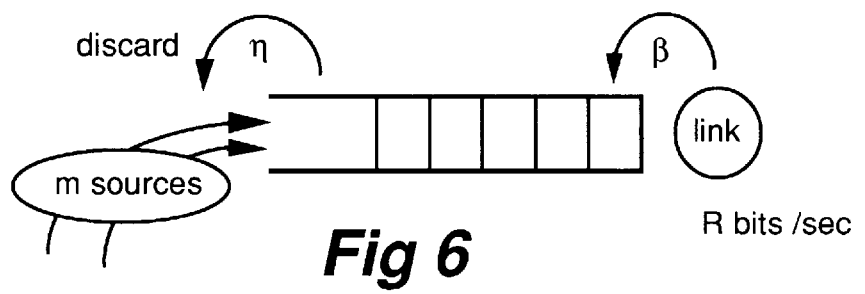
FIG. 6 is a diagram of a queueing system with decomposed parameters.

As depicted in FIG. 6, the problem is decomposed into two components. The case of homogeneous traffic is treated first. A number of sources, m, with identical traffic descriptors share a link of capacity R (bits/s). When the combined rate of the active sources exceeds R, or when there are waiting cells in the buffer, new cells must join the buffer. When the buffer is full, any new cell arrival is lost. We denote by β the probability of arriving cells joining the buffer, and η the conditional probability of the buffer occupancy exceeding a given threshold, given that the buffer is not empty. For connections of delay-sensitive traffic, η represents the probability of the buffer occupancy exceeding a given threshold. The threshold equals the entire buffer size for delay-tolerant, but loss-sensitive, traffic. In the bufferless approach of ATM multiplexer analysis described earlier, the buffer size is assumed to be zero and the QOS is determined solely by β. However, for the system described in FIGS. 2 and 3, the calculation of the QOS is more involved, as will be described immediately below. The ON-OFF cell-level traffic model mentioned above is used.

Step 1: Calculate β (the Probability of Joining the Buffer)

Determine the blocking b in an equivalent loss system of n servers, $n=R/\gamma$, with offered traffic $A=m\theta=n\rho$. A fast procedure for computing the blocking with an error of the order of $10^{-k}$ (in this application k would typically be chosen to be 8 or so) is:

Set $\pi \leftarrow 1, \sigma \leftarrow 1$

For $(j=n \ldots 1, j \geq 1, \pi > 10^{-k}, \sigma < 10^k)$ $\{\pi \leftarrow \pi j/A, \sigma \leftarrow \sigma + \pi\}$ The blocking in a loss-system with $n=R/\gamma$ servers and an infinite number of sources is then:

$$b = E(A, n) = 1/\sigma \tag{2}$$

The blocking with a finite number, m, of sources is approximated by:

$$b = \{1-(n/m)\}/\sigma = (1-R/(m\gamma))/\sigma, \text{ for } m\gamma \geq R \tag{3}$$

$(b=0 \text{ if } m\gamma < R)$.

The probability $\beta$ of joining the buffer is then:

$$\beta = b/(1-\rho+\rho b), \rho < 1. \tag{4}$$

Step 2: Calculate η (the Probability of Buffer Overflow)

Calculate the conditional cell-loss η as:

$$\log_e \eta = (L/x)(m\gamma/R)\{\theta/(1-\theta) - R/(m\gamma - R)\} \tag{5}$$

Expression (5) can be derived from the Gibbens-Hunt formula described in their article [1], observing that $m\omega=R$ at full call-level occupancy. When $\theta \to 0$ and $m \to \infty$, such that $0 < \rho = m\theta\gamma/R < 1$, then $$\log_e \eta \to -(L/x)(1-\rho) \tag{6}$$

which is a characteristic of an M/M/1 queueing system. For a finite m, it is noted that:

$$\log_e \eta = (L/x)(m\gamma/R)\{\theta/(1-\theta) - R/(m\gamma-R)\} < (-L/x)(1-\rho) < 0 \tag{7}$$

Step 3: Determine the Permissible Buffer-Overflow Probability

With S denoting the natural logarithm of the QOS, the connection request (call) should be accepted if $$\log_e \beta + \log_e \eta \leq S > 0 \tag{8}$$

Thus, the admission, or otherwise, of a new connection request requires computing $\beta$ its logarithm, and evaluating $\log_e \eta$ from (5). The execution time is of the order of a fraction of a milli-second using a typical commercial processor.

(b) Inverse Calculation

In the inverse calculation, it is required to find the number, m, of homogeneous sources which can be admitted (or equivalently, the EBR ω of each source) without violating a specified QOS. As indicated earlier, the inverse method is simple when the bufferless approximation can be used. In the normal case, however, where the buffer's existence is recognized, the EBR can be determined by iterative application (using bisection, for example) of the direct method. A fast numerical procedure based on bisection and interpolation is outlined below. Once the number, m, of permissible sources is determined, the EBR ω is then determined as: $\omega = R/m$.

The minimum admissible number of sources (for a non-trivial solution) is $m_1 = R/\gamma$, and the maximum is $m_2 = m_1/\theta$. The mean value is then $m = (m_2 + m_1)/2 = R/\Omega_0$, where $\Omega_0$ is a zero order approximation of the EBR. Thus:

$$\Omega_0 \gamma (2\theta)/(1+\theta) \tag{9}$$

A first-order approximation $\Omega_1$ is then determined by taking into account the dynamics of the system. Using the above rough estimate of EBR, the mean cell-level occupancy ρ, $\rho < 1$ of the link can be determined by: $\rho = \theta\gamma/\Omega_0$. The number n of active sources which can be accommodated simultaneously is $n = R\gamma$ and the mean offered load is $A = n\rho = R\theta/\Omega_0$.

The value of b is determined from:

$$b = (1-\Omega_0/\gamma) E(A, n) \tag{10}$$

$E(A, n)$ being the Erlang loss function with "A" Erlangs offered to n servers (n need not be an integer). β is then determined from equation (4) above.

Now the buffer's contribution to performance is taken into consideration. With η being the permissible buffer-overflow probability and $\delta = \log_e \eta$, then:

$$\delta = S - \log_e \beta < 0 \tag{11}$$

An improved estimate of the EBR is then determined from the rewritten Gibbens-Hunt formula with modified cell-loss probability:

$$\omega_1 = \gamma(1+\epsilon+y-\sqrt{(1+\epsilon-y)^{2+4y}})/(2\epsilon) \tag{12}$$

where $$\epsilon = (x/L)\delta < 0, \text{ and } y = \theta/(1-\theta) \tag{12}$$

It should be noted that δ, not S, where $S < \delta < 0$ is used in this calculation. If we decide to stop at this point, then the first-order solution is $$\Omega_1 = (\Omega_0 + \omega_1)/2 \tag{13}$$

Figure 7:
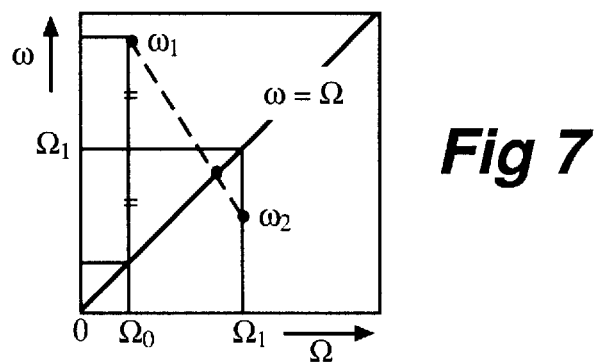
FIG. 7 is a graph showing the interpolation process to determine the EBR.

To obtain a second-order solution, repeat the above step using the first-order solution as the starting point, i.e, replace $\Omega_0$ by $\Omega_1$. This process can be repeated for higher-order solutions, if desired. Let $(\Omega j-1, \Omega j)$ and $(\Omega_j, \omega_{j+1})$, $j=1, 2, \ldots$, be the initial and resulting EBR values of two successive steps, and define u and v as: $u = \Omega j - \Omega_{j-1}$ and $v = \omega_{j+1} - \omega_j$. The solution is then determined by an interpolation process as depicted in FIG. 7 (the case for j=1, i.e., the second order solution, is shown in the figure). The solution is the intersection of the line $\omega = \Omega$, and the line defined by $(\Omega_{j-1}, \omega_j)$ and $(\Omega_j, \omega_{j+1})$:

$$\omega = (v\,\Omega_j - u\,\omega_{j+1})/(v-u) \tag{14}$$

The permissible number of sources, m, is then $m=R/\omega$.

(c) Delay Threshold

The cell-delay threshold is defined as the value of the cell delay which should not be exceeded by more than a specified probability, for example $10^{-8}$. A cell-delay threshold rather than the cell-loss probability may be used as a measure of quality of service for delay-sensitive traffic streams. In this case, the buffer length L is replaced by Λ which equals the delay threshold Δ multiplied by the service rate. For example, if the delay threshold is 250 μsecs, and if the service rate (the link rate or class rate) is 350,000 cells per second, then Λ is only 87.

(d) Connection Admission Control with a Two-Level Service-Rate Controller

FIGS. 8 and 9 show a two-level controller where the primary controller serves four classes of delay-sensitive protected traffic and the secondary controller serves eight classes of delay-tolerant protected traffic. This corresponds to the situation shown in FIG. 2. The service periods are shown as contiguous periods in the pie charts for clarity purposes; the actual service slots would be dispersed. The 5 primary classes may include CBR traffic or real-time VBR traffic with preserved peak rate or other stringent real-time requirements. A null-class in the primary controller may be used to guarantee a minimum-service rate for the secondary classes. The secondary classes are for delay-tolerant traffic streams. A null-class in the secondary controller may be used to guarantee a minimum (courtesy) service rate to UBR-like traffic.

In a two-level controller, each of the primary classes is allocated a service rate and the computation of the EBR (equivalent bit rate) for primary-class connections is straightforward and will be described in detail immediately below. The service rate for the secondary classes is the sum of the primary null-class allocations, if any, and a portion of the unused primary capacity. For illustration, we may consider some special cases, e.g., the primary classes are for CBR traffic in FIG. 10, a mixture of CBR and smooth delay-sensitive VBR traffic in FIG. 11, and high-burstiness delay-tolerant VBR traffic in FIG. 12.

The mean value of the total cell rate is assumed to be the same in the cases of FIGS. 10–12. The rapid fluctuations of the CBR streams of FIG. 10 are relatively harmless to other streams. The cell rate of the mixture of CBR and smooth VBR streams is likely to vary at a slower rate, forcing a reduced available capacity. In FIG. 12, the cell rate for bursty VBR streams would vary at a slower rate than that of FIG. 11 and the remaining available capacity decreases. With the above assumptions: $R_0 > R_1 > R_2$.

(e) EBR Calculation with Two-Level Controllers

A simple way to handle the connection classes is to provide separate queues at every contention point in the ATM network (e.g., at each egress port of a switch). These queues would be served according to some rate-control schemes. The egress service discipline may have some impact on the admission control criteria.

Let R be the link rate, and C be the number of classes of delay-sensitive traffic. Let $\chi_k$ be the service rate for class k and $T_k$ be the delay threshold for class k, $0 \leq k < C$, which may be exceeded with a prescribed small probability. The permissible number $\Lambda_k$ of waiting cells for class k is then:

$$\Lambda_k = T_k \chi_k, \ 0 \leq k < C.$$

Let $\psi$ be the total service rate of the delay-sensitive traffic, i.e., $$\psi = \sum_{j=0}^{C-1} \chi_j,$$

and let F (d, R, λ) be the equivalent bit rate for a connection with cell-level descriptors given by the vector d, served at a rate R, and with a permissible number of waiting cells λ, such that the probability of exceeding λ is less than a preset QOS parameter ($10^{-8}$, for example). The function F( . . . , . . . ) may be determined by the method described above in (b) Inverse Calculation.

The equivalent bit rate of connection j of class k is then determined as:

$$\omega_{j,k} = F(D_{j,k}, \chi_k, \Lambda_k), \ 0 \leq j < J, 0 \leq k < C,$$

and the connection number J–1 is accepted if:

$$\sum_{j=0}^{J-1} \omega_{j,k} \leq \chi_k.$$

With each accepted connection, we must also calculate the full-sharing equivalent-bit-rate $\Omega_{j,k}$ which would result if each connection was to be served at the total rate $\psi$ allocated to the C classes of the delay-sensitive traffic when the need arises:

$$\Omega_{j,k} = F(D_{j,k}, \psi, L), \ 0 \leq j < J, \ 0 \leq k < C.$$

Note that $\omega_{j,k} \geq \Omega_{j,k}, \ 0 \leq k < C$. The remaining service rate $\tilde{R}$ for the delay-tolerant traffic is then:

$$\tilde{R} = R - \sum_{k=0}^{C-1} \chi_k + \sum_{k=0}^{C-1} \sum_{j=0}^{V_k-1} (\omega_{j,k} - \Omega_{j,k}),$$

where $V_k$ is the number of accepted connections in class k.

(f) Numerical Verification

Figure 13:
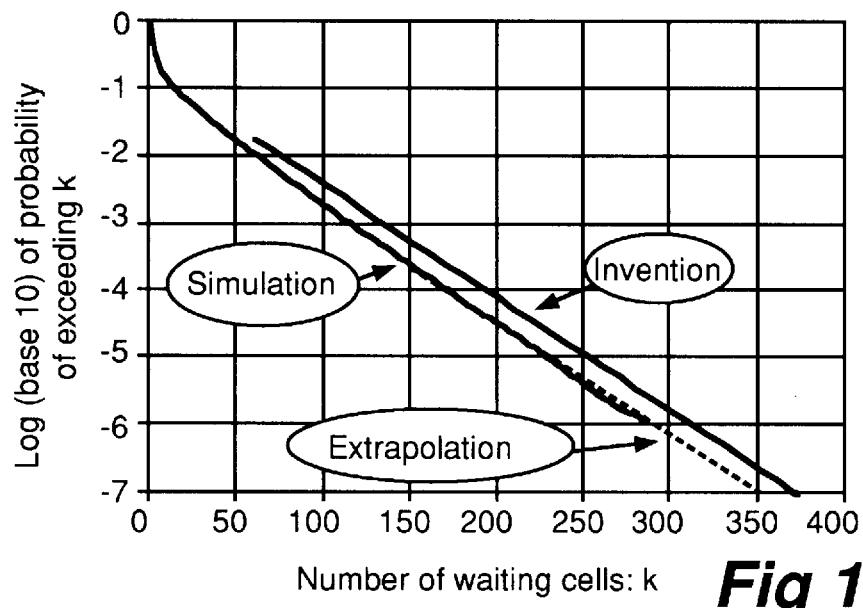
FIG. 13 is a graph which compares the invention and a simulation result.
Figure 14:
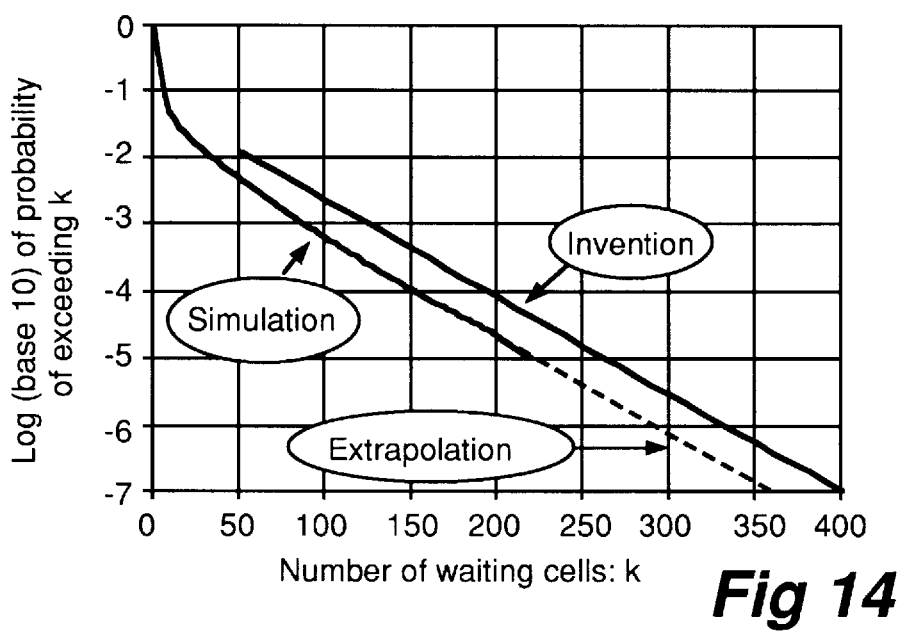
FIG. 14 is another graph which compares the invention and a simulation result under different settings.

The approach of the present invention thus far described was verified by simulation and by comparison with the Buffet-Duffield (BD) bound described in the above-referenced article [3]. In the simulation example of FIG. 13, the traffic parameters are: ratio of peak rate to link rate $\gamma/R=0.1$, source-occupancy $\theta=0.1$, number of sources m=70 (i.e., the mean cell-level occupancy p of the link is 0.7 when the cell-loss is negligible). FIG. 14 shows the performance with the parameters: $\gamma/R=0.02$, $\theta=0.2$, and m=200, i.e., the mean cell-level occupancy is 0.8. In both cases, the mean burst length x=10. The ON-OFF cell-level model was used with both the active and silent periods being geometrically distributed. The number of cell arrivals used in the simulation was just sufficient to produce the complementary function to the $10^{-5}$ accuracy level. The complementary function is then extrapolated. Several other cases were used for verification, and the results indicate that the present invention is conservative.

Figure 15:
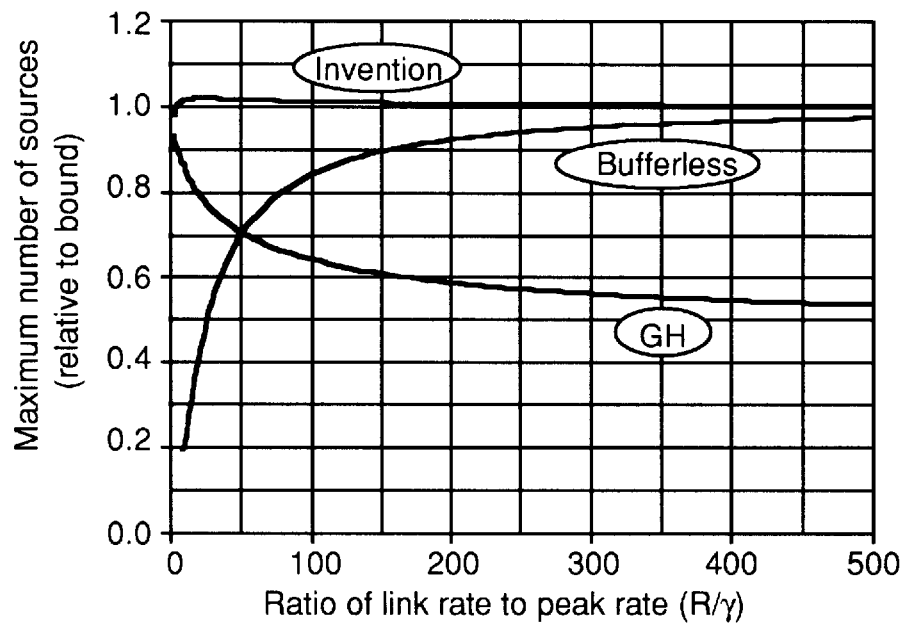
FIG. 15 is a graph showing the traffic capacity calculations of different methods relative to the Buffet-Duffield (BD) bound.

In FIG. 15, the present invention is compared with the bufferless approximation and the plain Gibbens-Hunt method for a system with parameters: $\theta=0.1$, x=100, L=2000, and a wide range of the ratio R/γ. The number of admissible sources (connections), i.e., the ratio of the link rate to the EBR, for the three approaches, is compared with the lower bound of the number of admissible connections as determined from the BD approach. The bufferless-approximation approach is acceptable when the link rate (or designated part thereof), R, is higher than the peak rate, γ, of the source by at least two orders of magnitude. The Gibbens-Hunt (GH) EBR does not account for the effect of link-capacity sharing by several sources. It produces reasonable results, however, when the sharing gain is insignificant. The sharing gain is small when the R/γ ratio is small, in which case the number of admissible sources determined by the GH method approaches the number determined by the BD bound or the present invention as shown in FIG. 15. In the figure, the number of admissible sources determined by the BD bound is normalized to unity to be used as a reference.

(g) Admission Control: Heterogeneous Traffic

Communication traffic can be homogeneous or heterogeneous. In homogeneous traffic, all the sources are identical in terms of traffic characteristics as well as QOS requirements, whereas the heterogeneous traffic contains sources of distinctly-different descriptors. In the case of heterogeneous traffic, where the link carries a mixture of low-speed and high-speed connections, the arrival rate of the low-speed calls would normally be much higher than the arrival rate of high-speed calls, and the simplified calculation in the low-speed case (using the bufferless approximation) should reduce the CAC processor's load appreciably. The analytical treatment of the multiplexing of heterogeneous sources seems to be complicated. For a practical real-time implementation, the homogeneous-traffic approximation is used and it is verified that such an approach would yield conservative results. Consider a mixture of K traffic streams with cell-level traffic descriptors of different values. When the EBR is calculated for a single stream, using the procedure described above, the implicit assumption is that all of the connections in the path under consideration have identical descriptors. Consider two links of equal capacity R (bits/sec), each serving a number of sources of identical descriptors. Let the sources of the first link generate smooth traffic and the sources of the second link generate rough (bursty) traffic, and let $\omega_1$ and $\omega_2$ be the EBR per source of the first and second types, respectively. The number of sources that can be accommodated in the two links are $R/\omega_1$ and $R/\omega_2$. Assume that $m_1$ connections of the first type and $m_2$ connections of the second type share a single link of capacity R bits/sec ($m_1 < R/\omega_1$ and $m_2 < R/\omega_2$). Let the "true" EBR values in the heterogeneous system be $\omega_1^*$ and $\omega_2^*$, respectively. Then, $\omega_1$ is an underestimation of $\omega_1^*$ and $\omega_2$ is an overestimation of $\omega_2^*$. With the nonlinearity of the load-service characteristics, it can be reasoned that:

$$m_2(\omega_2 - \omega_2^*) > m_1(\omega_1^* - \omega_1),$$

i.e., $m_1\omega_1 + m_2\omega_2 > m_1\omega_1^* + m_2\omega_2^*$.

Thus, using the EBR values based on the homogeneous-traffic assumption leads to an aggregate upper bound of the call-level utilization. The resulting capacity waste has been evaluated by simulation experiments and found to be acceptable. In the example below, four streams with the number of sources and descriptors of the table below share a link with a 1000-cell buffer. Number of Descriptors mean EBR Occupancy

| Number of Sources | Descriptors | | | | mean EBR | Occupancy | |
|---|---|---|---|---|---|---|---|
| | $\gamma/R$ | $\theta$ | x | r/R | $\omega/R$ | cell | call |
| 11 | .20 | .1 | 10 | .02 | .0220 | .22 | .251 |
| 10 | .10 | .2 | 20 | .02 | .0245 | .20 | .245 |
| 11 | .05 | .4 | 30 | .02 | .0231 | .22 | .254 |
| 25 | .02 | .4 | 50 | .008 | .0100 | .20 | .250 |
| | | | | | Total | .84 | 1.0 |

Figure 16:
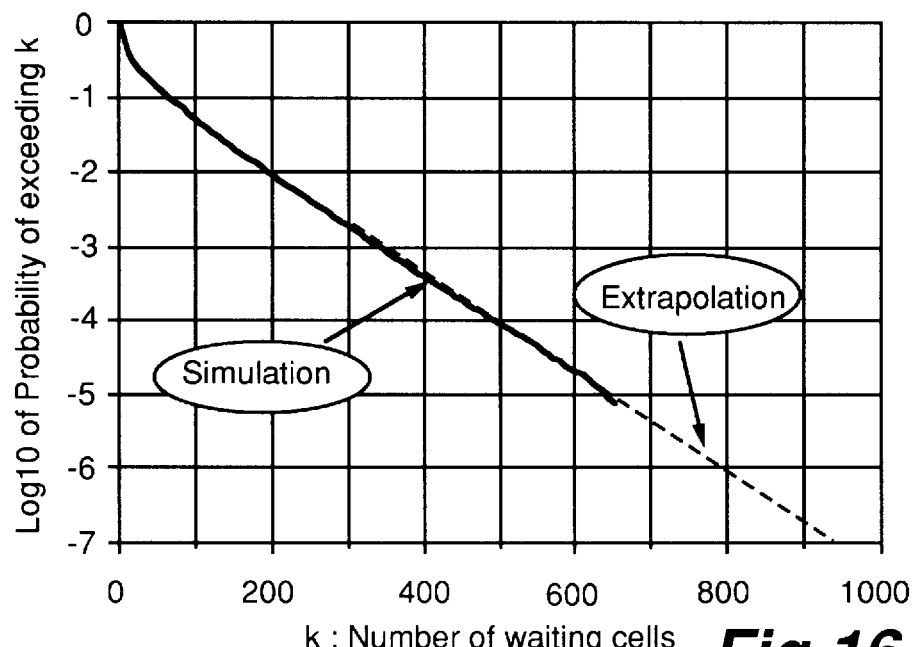
FIG. 16 shows simulation verification of heterogeneous approach.

The required QOS is $10^{-7}$. The EBR for each source is determined independently, and the sum of the EBR values equals the link rate. In the simulation, the sources are mixed and the buffer-occupancy distribution is determined. FIG. 16 shows the result of simulation verification of the heterogeneous approach. The simulation results are based on $10^9$ cell arrivals. According to the simulation result, the number of waiting cells exceeded with a probability of $10^{-7}$ is 940 (instead of 1000). The analytical solution is slightly conservative, as expected.

(h) Buffet-Duffield Bound for Homogeneous Traffic

Figure 17:
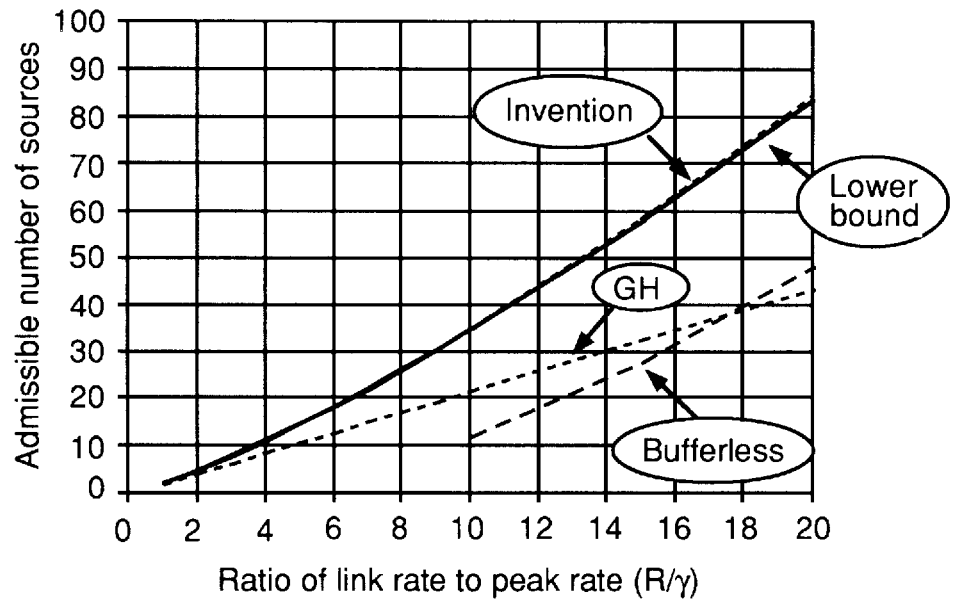
FIG. 17 is a comparison of admissible homogeneous sources calculated by different methods.

The Buffet-Duffield (BD) bound [3] is used to verify the accuracy of the method of the invention. The bound is quite tight, as verified by simulation, and can be used directly for admission control. The required computational effort may be higher than that of the method of the invention. FIG. 17 compares the method of the invention with the BD bound for different values of the link-rate to peak-rate ratio. Results based on the plain Gibbens-Hunt EBR and the bufferless approximation are also shown; both yield very pessimistic results. The parameters are: buffer size L=1000, source occupancy $\theta=0.1$, mean burst length x=100, and the objective QOS $\Delta=10^{-7}$.

Figure 18:
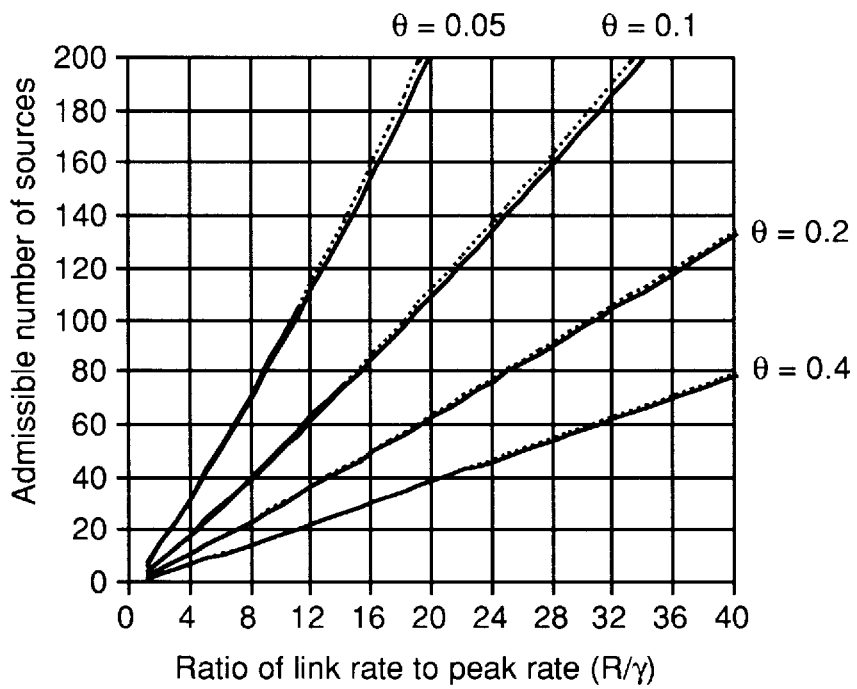
FIG. 18 compares the admissible number of connections according to the invention and the BD bound.

FIG. 18 compares the invention and the BD bound. For the four cases shown, the parameters are: objective QOS of $10^{-7}$, mean burst length x=100, and buffer size L=2000, with the ratio $R/\gamma$ varying between 1 and 40. The four cases shown differ in the source-occupancy $\theta$ which assumes the values 0.05, 0.1, 0.2, and 0.4 as indicated in the figure. The number of admissible sources, as determined by the method of the invention, is slightly higher than the bound, as it should. It is noted that, for the same link rate R, peak rate $\gamma$, burst length x, buffer size L, and QOS objective, the link cell-level occupancy ($\rho = m\gamma\theta/R$) increases as the source occupancy $\theta$ increases. In FIG. 18, the maximum cell-level occupancy of the link at $R/\gamma=20$, for example, increases from 0.525 when $\theta=0.05$, to 0.78 when $\theta=0.4$, which amounts to about 49% increase.

The above-described method realizes a high accuracy and a high link efficiency in comparison with existing methods. The development of this method is motivated by a number of factors:

(1) The use of ATM already involves a significant overhead, and further waste due to inaccurate calculation of the required resources may render the use of ATM unattractive.

(2) Existing methods which attempt to account for the effect of resource sharing occasionally result in serious underestimation of the required resources, thus compromising the QOS.

(3) The high-speed messaging facility of the broadband network offers an opportunity of fast exchange of connection descriptors' information.

What is claimed is:

1. In an ATM network including a plurality of nodes connected by links, a method of managing the ATM network by call admission control on a connection request at one of the nodes which includes a buffer at each designated link, comprising steps of:

calculating the probability $\beta$ of incoming cells of the requested connection joining the buffer, if the requested connection is to be accepted;

calculating the probability $\eta$ of the buffer overflowing when the cells of the requested connection must join the buffer, if the requested connection is to be accepted; and determining that the requested connection can be admitted, if $\log_e \beta + \log_e \eta < S < 0$, where S is the natural logarithm of a predetermined quality-of-service value for the connection.

2. The method of managing an ATM network, according to claim 1 in which the designated link is holding m connections, m being a positive integer, and the requested connection has a mean source occupancy $\theta$, peak rate $\gamma$, and mean value x of the number of cells in the ON period, wherein the step of calculating the probability $\eta$ includes a step of:

calculating the conditional cell-loss probability using the following formula, $\log_e \eta = (L/x)(m\gamma/R)\{\theta/(1-\theta) - R/$ ($m\gamma-R$)}, where L is the buffer size and R is the capacity of the designated link at the node.

3. The method of managing an ATM network, according to claim 2 wherein the step of calculating the probability $\beta$ includes steps of:

determining the blocking b in an equivalent loss system of n servers, $n=R/\gamma$, with offered traffic $A=m\theta=n\rho$ by the following equation:

$b=(1-n/m)E(A,n)$, where $E(A,n)$ is the Erlang function and $\rho$ is the link mean cell occupancy; and calculating $\beta$ from $\beta=b/(1-\rho+\rho b)$.

4. The method of managing an ATM network, according to claim 3, wherein all the connections are classified into plural streams of homogeneous traffic.

5. The method of managing an ATM network, according to claim 4, wherein the designated link is holding a plurality of connections classified in more than one class, one unprotected class serving unprotected traffic and all other protected classes serving protected traffic, comprising further steps of:

allocating to each of the protected classes a known service rate representing a part of the link capacity;

allocating to the unprotected class the remaining part of the link capacity; and performing the admission control to connections of each protected class according to the quality of service associated with said each protected class.

6. The method of managing an ATM network, according to claim 1 wherein the step of calculating the probability $\beta$ includes steps of:

determining the blocking b in an equivalent loss system of n servers, $n=R/\gamma$, with offered traffic $A=m\theta=n\rho$ by the following equation $b=(1-n/m)E(A,n)$ where $E(A,n)$ is the Erlang function and $\rho$ is the link mean cell occupancy; and calculating $\beta$ from $\beta=b/(1-\rho+\rho b)$.

7. The method of managing the ATM network by call admission control on a connection request at one of the nodes which includes a buffer at each designated link, according to claim 1, wherein the requested connection is for delay sensitive traffic and the step of calculating the probability $\eta$ includes a step of:

calculating the conditional probability, $\eta$, of cell delay exceeding $\Delta$ time slots using the following formula:

$\log_e\eta=(\Delta/x)(m\gamma)\{\theta/(1-\theta)-R'/(m\gamma-R')\}$, where $\Delta$ is the cell delay threshold of the class of the requested connection, and R' is the service rate of the class.

8. In an ATM network, a method of controlling traffic by a call admission control on a requested connection at a node which includes a buffer on each designated link, comprising steps of:

calculating the probability $\beta$ of cells of the requested connection joining the buffer, if the requested connection is to be accepted;

calculating the probability $\eta$ of the buffer overflowing if the requested connection is to be accepted;

calculating the equivalent bit rate $\omega$ of the requested connection from $\beta$ and $\eta$ above; and determining that the requested connection can be admitted, if $\omega<W$, where W is an available bit rate of the designated link.

9. The method according to claim 8, wherein a zero-order-approximation $\Omega_0$ of the equivalent bit rate $\omega$ is determined from $\Omega_0=\gamma(2\theta)/(1+\theta)$, where $\theta$ is the mean source occupancy and $\gamma$ is the peak rate of the requested connection and on the assumption that the connections are homogeneous.

10. The method according to claim 9, wherein a first-order approximation $\Omega_1$ of the equivalent bit rate $\omega$ is calculated by the following formula:

$\Omega_1=(\Omega_0+\omega_1)/2$, where $\omega_1=\gamma(1+\epsilon+y-\sqrt{(1+\epsilon-y)^{2+4y}})/(2\epsilon,)$ and $\epsilon=(x/L)\delta<0$, and $y=\theta/(1-\theta)$ where $\delta=S-\log_e(\beta)$, x is the mean value of the number of cells in the ON period and L is the buffer size.

11. The method according to claim 9, wherein the second order approximation $\Omega_2$ of the equivalent bit rate $\omega$ is calculated by bisection and interpolation.

12. The method according to claim 11 wherein the admission of a new connection request is determined by calculating the permissible number of calls using any of the approximations of the equivalent bit rate $\omega$ and the capacity of the designated link.

13. The method according to claim 10, wherein the requested connection is for delay sensitive traffic and a first-order approximation $\Omega_1$ of the equivalent bit rate $\omega$ is calculated by the following formula:

$\Omega_1=(\Omega_0+\omega_1)/2$, where $\Omega_0$ is the zero-order approximation, $\omega_1=\gamma(1+\epsilon+y-\sqrt{(1+\epsilon-y)^2+4y})/2\epsilon$ and $\epsilon=(x/\Lambda)\delta<0$, and $y=\theta/(1-\theta)$ where $\delta=S-\log_e\beta$, x is a mean value of the number of cells in the ON period, $\Lambda$ is the cell delay threshold multiplied by the service rate of the class of the requested connection, and S is the natural logarithm of the specified quality-of-service, where $S<0$.

14. The method according to claim 13, wherein the second order approximation $\Omega_2$ of the equivalent bit rate $\omega$ is calculated by bisection and interpolation.

15. The method according to claim 8 wherein the admission of a new connection request is determined by calculating the permissible number of calls using the equivalent bit rate $\omega$ and the capacity of the designated link, or a designated part thereof.

16. The method of managing an ATM network, according to claim 8, wherein heterogeneous connections exist through the node of the ATM network, comprising steps of:

calculating $\log_e\beta$ and $\log_e\eta$ by treating the heterogeneous connections as if they are homogeneous connections;

determining the equivalent bit rate $\omega$ of the connection using any of the approximations of the equivalent bit rate $\omega$ and the capacity of the designated link; and determining that the requested connection can be admitted, if $\omega<W$, where W is an available bit rate of the designated link.

17. The method of managing an ATM network, according to claim 16, wherein the designated link is holding a plurality of connections classified in more than one class, one unprotected class serving unprotected traffic and all other protected classes serving protected traffic, comprising further steps of:

allocating to each of the protected classes a known service rate representing a part of the link capacity;

allocating to the unprotected class the remaining part of the link capacity; and performing the admission control to connections of each protected class according to the permissible number of calls using any of the approximations of the equivalent bit rate $\omega$ and the capacity of the designated link.

18. The method of managing an ATM network, according to claim 17, wherein a primary controller serves delay sensitive protected traffic of several classes and a secondary controller serves delay tolerant protected traffic of several classes, comprising steps of:

the primary controller allocating to each of the protected classes of the delay sensitive traffic a primary service rate representing a part of the link capacity; and the secondary controller allocating to the protected classes of the delay tolerant traffic secondary service rates, each of the secondary service rates being based on the link capacity which remains unused by the protected classes of the delay sensitive traffic.

19. The method according to claim 18 wherein the link capacity which remains unused by the protected classes of the delay sensitive traffic is calculated as the sum of a null-class allocation in the primary controller and a pooled unused capacity of the protected classes of the delay sensitive traffic.

20. The method according to claim 19 where the pooled unused capacity is determined by computing the sum over all delay-sensitive-traffic classes of the difference between the EBR $\omega_{j,k}$ based on the service rate for connection j of class k, which is calculated using the service rate allocation $\chi_k$ of class k, and an EBR $\Omega_{j,k}$ of connection j of class k, which is calculated using the sum $\psi$ of the total service rate allocation of the classes of the delay sensitive traffic.

* * * * *